United States Patent [19]

Jakob et al.

[11] 4,116,946

[45] Sep. 26, 1978

[54] HARDENABLE MIXTURES CONTAINING POLYFUNCTIONAL AROMATIC CYANIC ACID ESTERS

[75] Inventors: Hans-Dieter Jakob, Leverkusen; Rolf Kubens, Odenthal; Heinrich Heine, Leverkusen, all of Germany

[73] Assignee: Bayer Aktiengesellschaft, Germany

[21] Appl. No.: 808,023

[22] Filed: Jun. 20, 1977

[30] Foreign Application Priority Data

Jun. 24, 1976 [DE] Fed. Rep. of Germany ....... 2628417

[51] Int. Cl.$^2$ .................... C08F 28/00; C08G 75/00
[52] U.S. Cl. .................................... 528/172; 528/271; 528/364; 528/363; 528/422; 528/192; 528/205; 528/210; 528/361; 528/391; 528/392
[58] Field of Search ........... 526/11.1; 260/79, 79.3 M, 260/79.5 C

[56] References Cited

FOREIGN PATENT DOCUMENTS 1,258,599 1/1968 Fed. Rep. of Germany.
1,007,790 8/1963 United Kingdom.

*Primary Examiner*—Herbert J. Lilling
*Attorney, Agent, or Firm*—Connolly and Hutz

[57] ABSTRACT

Hardenable mixtures of

A. 40 to 90% by weight of at least one aromatic polyfunctional cyanic acid ester, B. 10 to 60% by weight of at least one polymerizable olefinically unsaturated monomer and, optionally, C. 0.01 to 10% by weight, based on the sum of A) and B) of at least one hardening catalyst such as amines, Mannich bases and organic metal compounds. They are suitable for use as casting resins and as pourable sealing compounds for covering materials, for producing shaped articles, coatings, bonds, electrical insulations, as binders for fibre-reinforced plastics.

8 Claims, No Drawings

HARDENABLE MIXTURES CONTAINING POLYFUNCTIONAL AROMATIC CYANIC ACID ESTERS

This invention relates to hardenable mixtures of polyfunctional aromatic cyanic acid esters, polymerisable olefinically unsaturated monomers and, optionally, hardening catalysts, and to a process for producing the hardened products.

It is known that copolymers can be produced from mixtures of polyisocyanates and ethylenically unsaturated compounds (for example German Offenlegungsschrift No. 3,432,952). This process is attended by the disadvantage that polyisocyanates enter into a number of troublesome secondary reactions. For example, they react with atmospheric moisture or with water to form ureas and carbon dioxide which can be a disadvantage in the production of shaped articles. In cases where copolymerisation is carried out at elevated temperatures, isocyanates can be reacted to form carbodiimides, again with evolution of carbon dioxide and bubble formation.

It is also known (cf. German Patent Specification No. 1,190,184) that polytriazines can be produced by polymerising polyfunctional aromatic cyanic acid esters at elevated temperature. One disadvantage of this process is the often inadequate reproducibility of the results. Another disadvantage of this reaction, where it is used to produce hardened mouldings, is the fact that the polyfunctional aromatic cyanic acid esters generally have to be melted at elevated temperatures, and the fact that the polymerisation reaction is accompanied by significant shrinkage phenomena which, in the case of mouldings for example, readily result in the formation of bubbles and cracks. It has also been proposed to subject the polyfunctional aromatic cyanic acid esters before hardening to a thermal pretreatment at temperatures in the range from 50° C. to 150° C. The disadvantage of this process is that the thermal pretreatment leads to highly viscous or solid resin-like products.

According to another proposal (cf. German Auslegescrift No. 1,258,599), starting materials of relatively high molecular weight, which can only be processed in the form of solutions or dispersions, can be obtained by crosslinking homopolymers of monoolefinically unsaturated polymerisable compounds containing cyanic acid ester groups or copolymers of mono-olefinically unsaturated polymerisable compounds containing cyanic acid ester groups and at least one other olefinically unsaturated polymerisable compound on completion of the shaping or forming operation.

The present invention provides hardenable mixtures of

A. 40 to 90% by weight of at least one polyfunctional, aromatic cyanic acid ester,
B. 10 to 60% by weight of at least one polymerisable, olefinically, preferably ethylenically, unsaturated monomer and, optionally,
C. 0.01 to 10% by wt., based on the sum of (A) and (B), of at least one hardening catalyst.

The hardenable mixtures preferably contain from 50 to 70% by weight of the component (A), from 30 to 50% by weight of the component (B) and from 0.1 to 5% by weight of the component (C).

The present invention also provides a process for the production of hardened, shaped plastics articles, coverings, coatings and bonds, wherein a mixture of A. 40 to 90% by weight of at least one polyfunctional aromatic cyanic acid ester,
B. 10 to 60% by weight of at least one polymerisable, olefinically, preferably ethylenically, unsaturated monomer is heated to a temperature of from 20° to 250° C., optionally in the presence of
C. 0.01 to 10% by weight, based on the sum of A) and B), of at least one hardening catalyst and optionally in the presence of reinforcing agents, pigments, fillers, flameproofing additives, dyes, extenders and plasticisers, heating optionally being interrupted at any time before hardening and continued at a later stage. Provided suitable olefinically, preferably ethylenically, unsaturated compounds are selected, the mixtures according to the invention of the polyfunctional aromatic cyanic acid esters and the olefinically unsaturated compounds have the advantage of a very low viscosity before hardening so that, on the one hand, large amounts of fillers and reinforcing agents can be taken up whilst, on the other hand, porous materials may readily be impregnated. The products of hardening show high thermal stability, favourable mechanical and electrical properties and minimal shrinkage.

The process according to the invention is easy to carry out, can readily be reproduced and is extremely economical by virtue of the possibility of using olefinically unsaturated compounds as co-reagents.

The technical advance afforded by the process according to the invention is completely surprising and could not have been foreseen by the expert. Co-reactions with ethylenically unsaturated compounds are not described, nor are investigations such as these suggested, in the extensive literature on chemical reactions of aromatic cyanic acid esters (for example Angew. Chemie, 79 (1967), No. 5, pages 219–231). The aromatic cyanic acid esters which are essentially used for the process according to the invention and which are present in the hardenable mixtures correspond to the general formula

(I) Ar(OCN)$_n$  (I)

in which

Ar is an aromatic radical or an aromatic radical interrupted by bridge members and $n$ is a number from 2 to 5.

The aromatic cyanic acid esters of formula (I) used in accordance with the invention are known compounds, cf. for example U.K. Patent Specification No. 1,007,790, and may be produced by the process described there.

The aromatic cyanic acid esters preferably correspond to the general formula (II):

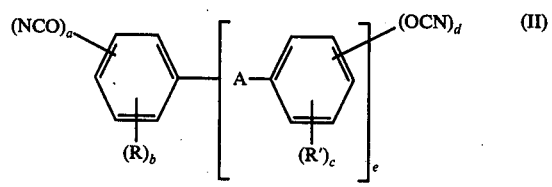

in which

R represents hydrogen, halogen (fluorine, chlorine, bromine, iodine), linear or branched $C_1$–$C_9$-alkyl or phenyl, more than one R radical may be the same or different or two adjacent radicals R on the same nucleus together forming a carbocyclic 5-membered or 6-membered ring or together and in conjunction with a hetero atom (O,S,N) forming a 5-membered or 6-membered heterocyclic ring, alkoxy radicals with 1 to 4 carbon atoms, alkoxy carbonyl radicals with 1 to 4 carbon atoms in the alkyl group;

R' has the same meaning as R or represents the group

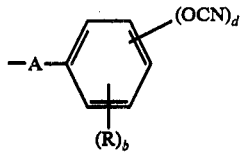

where A is a direct bond, a $C_1$-$C_9$-alkylene group optionally substituted by $C_1$-$C_4$-alkyl or phenyl, a cycloaliphatic or aromatic 5-membered or 6-membered ring optionally interrupted by an oxygen atom, oxygen, the sulphonyl group (—$SO_2$—), the carbonyl dioxy group

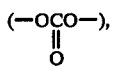

the carbonyl group;

$a$ is a number from 0 to 5 where $e = 1$ and a number from 2 to 5 where $e = 0$;
$b = 5 - a$ where $e = 1$ and $6 - (a + d)$ where $e = 0$; $c = 5 - d$;
$d$ is a number from 0 to 5;
$e$ is the number 0, 1, 2 or 3;

with the proviso that the sum of $a$ and $d$ $(a + d)$ always gives a number from 2 to 5.

More particularly, R and R' in the general formula (II) above represent hydrogen, chlorine or bromine, $C_1$-$C_4$-alkyl, methoxy, ethoxy, methoxy carbonyl, ethoxy carbonyl, butoxy carbonyl;

A is a direct bond, oxygen, the sulphonyl group, the carbonyl group, the carbonyl dioxy group, the methylene, ethylene or 2,2-propylene group

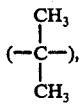

the cyclohexylene radical;

$a$ is the number 1 where $e = 1$ and the number 2 where $e = 0$;
$b$ is the number 1 or 2, more especially the number 1;
$c$ is the number 1 or 2, more especially the number 1;
$d$ is the number 0 or 1 and
$e$ is the number 0 or 1, with the proviso that $a + d = 2$.

The following compounds are mentioned as specific examples of compounds corresponding to formula (I) above: 1,3- and 1,4-dicyanatobenzene, 2-tert.-butyl-1,4-dicyanatobenzene, 2,4-dimethyl-1,3-dicyanatobenzene, 2,5-di-tert.-butyl-1,4-dicyanatobenzene, tetramethyl-1,4-dicyanatobenzene, 2,4,6-trimethyl-1,3-dicyanatobenzene, 4-chloro-1,3-dicyanatobenzene, 1,3-, 1,4-, 1,5-, 1,6-, 1,7-, 1,8-, 2,6-, 2,7-dicyanatonaphthalene and 1,3,5-tricyanatobenzene; 4,4'-dicyanatodiphenyl, 2,2'-dicyanatodiphenyl, 3,3',5,5'-tetramethyl-4,4'-dicyanatodiphenyl, 3,3',5,5'-tetrachloro-4,4'-dicyanatodiphenyl, 3,3',5,5'-tetrachloro-2,2'-dicyanatodiphenyl, 2,2',6,6'-tetrachloro-4,4'-dicyanatodiphenyl, 4,4'-bis-[(3-cyanato)-phenoxy]-diphenyl, 4,4'-bis-[(4-cyanato)-phenoxy]-diphenyl; 2,2'-dicyanato-1,1'-binaphthyl; 4,4'-dicyanatodiphenyl ether, 3,3',5,5'-tetramethyl-4,4'-dicyanatodiphenyl ether, 3,3',5,5'-tetrachloro-4,4'-dicyanatodiphenyl ether, 4,4'-bis-[p-cyanatophenoxy]-diphenyl ether, 4,4'-bis-[p-cyanatophenylisopropyl]-diphenyl ether, 4,4'-bis[p-cyanatophenoxy]-benzene, 4,4'-bis-[m-cyanatophenoxy]diphenyl ether, 4,4'-bis-[4-(4-cyanatophenoxy)-phenyl-sulphone]diphenyl ether; 4,4'-dicyanatodiphenyl sulphone, 3,3',5,5'-tetramethyl-4,4'-dicyanatodiphenyl sulphone, 3,3',5,5'-tetrachloro-4,4'-dicyanatodiphenyl sulphone, 4,4'-bis-[p-cyanatophenyl-isopropyl]-diphenyl sulphone, 4,4'-bis-[(4-cyanato)-phenoxy]-diphenyl sulphone, 4,4'-bis-[(3-cyanato)-phenoxy]-diphenyl sulphone, 4,4'-bis-[4-(4-cyanatophenyl-isopropyl)-phenoxy]-diphenyl sulphone, 4,4'-bis-[4-cyanatophenyl-sulphone)-phenoxy]-diphenyl sulphone, 4,4'-bis-[4-(4-cyanato)-diphenoxy]-diphenyl sulphone; 4,4'-dicyanatodiphenyl methane, 4,4'-bis-[p-cyanatophenyl]diphenyl methane, 2,2-bis-(p-cyanatophenyl)-propane, 2,2-bis-(3,5-dimethyl-4-cyanatophenyl)-propane, 2,2-bis(3,5-dichloro-4-cyanatophenyl)-propane, 1,1-bis-[p-cyanatophenyl]-cyclohexane, bis-[2-cyanato-1-naphthyl]-methane, 1,2-bis-[p-cyanatophenyl]-1,1,2,2-tetramethyl ethane, 4,4'-dicyanatobenzophenone, 4,4'-bis-(4-cyanato)-phenoxybenzophenone, 1,4-bis-[p-cyanatophenyl-isopropyl]-benzene, 2,2',5,5'-tetracyanatodiphenyl sulphone; polycyanic acid esters of novolaks (reaction products of phenol or alkyl- or halogen-substituted phenols with formaldehyde in acid solution) containing from 3 to 7 OCN groups; polycyanic acid esters with relatively long chains between two aromatic nuclei, for example cyanates corresponding to the formulae

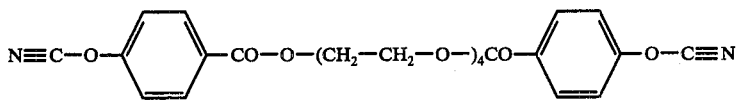

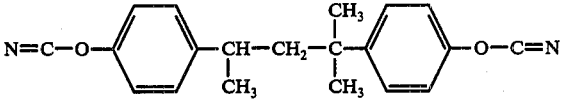

Examples of the olefinically unsaturated compounds suitable for use in the process according to the invention are diisobutylene, styrene, alkyl styrenes with 1 to 4 carbon atoms in the alkyl group, α-methyl styrene, vinyl chloride, vinyl acetate, (meth)acrylic acid esters with 1 to 8 carbon atoms in the alcohol component, acrylonitrile and diallyl phthalate, etc. It is preferred to use styrene and (meth)acrylic acid esters with 1 to 4 carbon atoms in the alcohol component, especially styrene. It is also possible to use mixtures of the above-mentioned monomers.

Reaction of the mixture to form the crosslinked plastics is carried out at temperatures in the range from 20° C. to 250° C. and preferably at temperatures of from 30° C. to 180° C.

The reaction is best carried out in the presence of from 0.01 to 10% and preferably in the presence of from 0.01 to 5%, based on the weight of the mixture, of a catalyst. Various substances are active as catalysts, such as amines for example, dimethyl benzylamine, Mannich bases which may be produced from phenolic substances, formaldehyde and dimethylamine, metal compounds for example, zinc octoate and organometallic tin compounds.

The products of hardening may be produced in a single stage, for example by exposure to the above-mentioned temperatures optionally in the presence of catalysts. It is also possible to interrupt the reaction, for example by cooling, after a certain conversion has been reached and to continue the reaction at a later stage.

In addition, other constituents for example, fillers, pigments, dyes, reinforcing agents such as fibre materials, for example, glass fibres, glass cloths, glass mats, also plasticisers and extenders, such as bitumen, coal tar, petroleum products, flameproofing additives, etc., may be added to the mixture of polyfunctional aromatic cyanic acid esters and the olefinically unsaturated compound.

The products of hardening produced in accordance with the invention may be used for a variety of different purposes. For example, they are suitable for use as casting resins and as pourable sealing compounds for covering materials such as coils, electrical components, for producing shaped articles, coatings, bonds, electrical insulations, as binders for fibre-reinforced plastics, for example glass-fibre-reinforced laminates. The invention is illustrated by the following Examples:

EXAMPLE 1

To produce a casting, 4,4′-dicyanatodiphenyl dimethyl methane was mixed with styrene in a ratio by weight of 2:1. By heating to approximately 50° C., the 4,4′-dicyanatodiphenyl dimethyl methane, which was solid and crystalline at room temperature, dissolved in the styrene. Further processing was carried out at 50° C. In the absence of a catalyst, this solution was storable for a few weeks.

For polymerisation, 1 part by weight of dimethyl benzylamine was added to 100 parts by weight of the reaction mixture described above. The casting resin composition was then poured into a metal mould coated with a release agent and heated to a temperature of 80° C. Hardening took place over a period of 4 hours at 80° C., followed by post-hardening for 16 hours at 160° C. A clear, pale yellow homogeneous casting was obtained and was found to have the following properties:

| | |
|---|---|
| Flexural strength (DIN 53452): | 167.3 MPa |
| Deflection (DIN 53452): | 4.6 mm |
| Impact strength (DIN 53453): | 20.8 kJ/m$^2$ |
| Ball indentation hardness H$_{30}$ (DIN 53456): | 220 MPa |
| Martens temperature (DIN 53462): | 142° C |

EXAMPLE 2

Following the procedure of Example 1, a mixture of 4,4′-diisocyanatodiphenyl dimethyl methane and styrene was prepared and catalysed with dimethyl benzylamine. In addition, 200 parts by weight of quartz powder were added to 100 parts by weight of this mixture. The reaction mixture was stirred in vacuo (approximately 10 mbar) for about 30 minutes at 50° C. and then cast as described in Example 1. Hardening took place over a period of 4 hours at 80° C. and was followed by post hardening for 16 hours at 160° C. The grey bubble-free casting thus produced was found to have the following properties:

| | |
|---|---|
| Flexural strength (DIN 53452): | 127.9 MPa |
| Deflection (DIN 53452): | 0.7 mm |
| Impact strength (DIN 53453): | 5.1 kJ/m$^2$ |
| Ball indentation hardness H$_{30}$ (DIN 53456): | 577 MPa |
| Martens temperature (DIN 53462): | 170° C |

EXAMPLE 3

A mixture of 4,4′-dicyanatodiphenyl dimethyl methane and styrene in a ratio by weight of 2:1 was heated to 50° C. 1 part by weight of tris-(dimethylaminoethyl)-phenol was then added to 100 parts by weight of the solution. After a short time the solution began to heat, a maximum temperature of approximately 70° C. occurring in the 1000 g batch. After the solution had cooled to room temperature, its viscosity had slightly increased. On cooling to 0° C., the solution remained completely clear. Further processing into a casting resin moulding composition, particularly in the presence of fillers, was thus considerably simplified. The catalysed solution was poured into a metal mould coated with a release agent and heated to 80° C. and was hardened for 4 hours at 80° C. and then for 16 hours at 160° C. Exactly the same procedure was adopted with a mixture of 100 parts by weight of the catalysed solution and 150 parts by weight of quartz powder which was stirred for 30 minutes in a vacuum of 10 mbar. The casting resin moulding compositions were found to have the following properties:

| | | |
|---|---|---|
| Tensile strength (DIN 53455): | 75.0 | 70.8 MPa |
| Elongation at break (DIN 53455): | 2.4 | 0.7 mm |
| E-modulus (DIN 53455): | 3630 | 12300 MPa |
| Flexural strength (DIN 53452): | 145.5 | 125 MPa |
| Deflection (DIN 53452): | 3.4 | 0.8 mm |
| Impact strength (DIN 53453): | 15.8 | 5.1 kJ/m$^2$ |
| Ball indentation hardness H$_{30}$ (DIN 53456): | 221.5 | 394 MPa |
| Martens temperature (DIN 53462): | 146 | 159°0 C |

EXAMPLE 4

4,4′-Dicyanatodiphenyl dimethyl methane was mixed with styrene in a ratio of 2:1 parts by weight, heated to 40° C. and prepolymerised by the addition of 2 parts by weight of tris-(dimethylaminomethyl)-phenol to 100 parts by weight of solution. By additionally adding 1 part by weight of dibutyl tin dilaurate to 100 parts by weight of mixture, the mass was adjusted to a gel time of about 90 seconds at 160° C. After the addition of 150 parts by weight of quartz powder to 100 parts by weight of the catalysed solution, a thinly liquid casting resin was obtained and may be processed by injection moulding as described for liquid epoxide casting resins in German Offenlegungsschrift No. 2,017,506. For a batch size of 7500 g, the resin composition remained processible for more than 8 hours at room temperature. The following processing conditions were selected for the production of 4 mm thick test plates: Mould temperature 160° C., injection pressure 5 bars, hardening time 5 minutes. Under these conditions, it was possible to produce satisfactory plates which were found to have the following properties after additional hardening for 16 hours at 160° C.:

| | |
|---|---|
| Tensile strength (DIN 53455): | 53.5 MPa |
| Elongation at break (DIN 53455): | 0.5 % |
| E-modulus (DIN 53455): | 11000 MPa |
| Flexural strength (DIN 53452): | 127.9 MPa |
| Deflection (DIN 53452): | 1 mm |
| Impact strength (DIN 53453): | 5.1 kJ/m$^2$ |
| Ball indentation hardness $H_{30}$ (DIN 53456): | 425.2 MPa |
| Martens temperature (DIN 53462): | 158° C |

EXAMPLE 5

A mixture of 66.6 parts by weight of 4,4'-dicyanatodiphenyl dimethyl methane, 33.3 parts by weight of styrene, 1 part by weight of dimethyl benzylamine and 200 parts by weight of quartz powder, was heated to 60° C. and stirred and degassed for about 15 minutes at that temperature in a vacuum of about 15 mbar. This casting resin was poured into a steel mould heated to 80° C., which had been coated with a release agent and in which metal fittings had been fixed, in such a way that no air bubbles were entrained. The casting, in the form of a supporting insulator, can be removed from the mould after a period of 4 hours. After additional hardening for 16 hours at 160° C., this supporting insulator was broken up and the force required for this purpose was measured. It amounted to 4.97 kN. The force required to break up a comparable supporting insulator of epoxide resin amounted to 4.36 kN.

The supporting insulator also had favourable electrical insulating properties. In particular, no leakage currents occur under voltage load in the high-voltage range. There was no evidence of any partial discharges inside the supporting insulator. The flashover voltage amounted to 82 kV.

EXAMPLE 6

To produce a laminate, an aminosilane-finished glass cloth of E-glass with a weight per unit area of approximately 200 g/m$^2$ was impregnated at 50° C. with a mixture, also heated to 50° C., of 66.6 parts by weight of 4,4'-dicyanatodiphenyl dimethyl methane, 33.3 parts by weight of styrene and 1 part by weight of dimethyl benzylamine. By placing 16 layers of this cloth, each impregnated with the casting resin by means of a brush, one on top of the other, a laminate with a layer thickness of approximately 4 mm was obtained. Hardening took place over a period of 4 hours at 80° C., followed by posthardening for 16 hours at 160° C. The properties of this laminate were as follows:

| | |
|---|---|
| Glass content: | 61.1% |
| Tensile strength (DIN 53455): | 643.8 MPa |
| Elongation at break (DIN 53455): | 1.7% |
| E-modulus (DIN 53455): | 22400 MPa |
| Flexural strength (DIN 53452): | 386.3 MPa |
| Deflection (DIN 53452): | 2.9 mm |
| Compressive strength (DIN 53454): | 277.6 MPa |

EXAMPLE 7

A mixture of 2 parts by weight 4,4'-dicyanatodiphenyl dimethyl methane and 1 part by weight of methacrylic acid methyl ester was heated to 60° C. 1 part by weight of dimethyl benzylamine was added as catalyst to 100 parts by weight of this solution. 1 part of this mixture was mixed with quartz powder in a ratio of 100 parts by weight of solution to 200 parts by weight of quartz powder, and stirred and at the same time degassed for 15 minutes at 60° C. under a vacuum of 15 mbar. The two casting resins were poured into metal mould coated with a release agent and heated to 80° C., and hardened for 4 hours. The castings were then removed from the moulds. A clear, homogeneous yellow casting and a grey casting free from air bubbles were obtained. After further hardening for 16 hours at 160° C., the following values were measured:

| | Unfilled | Filled with 200% of quartz power |
|---|---|---|
| Tensile strength (DIN 53455): | 85.1 | 74.2 MPa |
| Elongation at break (DIN 53455): | 3.1 | 0.6% |
| E-modulus (DIN 53455): | 3850 | 14400 MPa |
| Flexural strength (DIN 53452): | 169.9 | 130.8 MPa |
| Deflection (DIN 53452): | 5.3 | 0.8 mm |
| Impact strength (DIN 53453): | 28.0 | 6.5 kJ/m$^2$ |
| Ball indentation hardness $H_{30}$ (DIN 53456): | 218 | 533.4 MPa |
| Martens temperature (DIN 53462): | 135 | 163° C |

EXAMPLE 8 p-Phenylene dicyanate was mixed with butyl acrylate in a ratio by weight of 2:1 and heated to 70° C. 1 part by weight of dimethyl benzylamine was added as hardening catalyst to 100 parts by weight of the solution, and the casting resin was poured into a metal mould coated with a release agent and heated to 80° C. After 4 hours, the reaction mixture had hardened and could be removed from the mould, complete hardening being obtained after storage for another 16 hours at 160° C. The casting thus obtained was found to have the following properties:

| | |
|---|---|
| Tensile strength (DIN 53455): | 63.1 MPa |
| Elongation at break (DIN 53455): | 1.8% |
| E-modulus (DIN 53455): | 3420 MPa |
| Flexural strength (DIN 53452): | 112 MPa |
| Deflection (DIN 53452): | 1.7 mm |
| Impact strength (DIN 53453): | 7.2 kJ/m$^2$ |
| Ball indentation hardness $H_{30}$ (DIN 53456): | 187.7 MPa |
| Martens temperature (DIN 53462): | 112° C |

EXAMPLE 9

1,1'-bis-(4-cyanatophenyl)-ethane was mixed with methyl methacrylate in a ratio by weight of 3:2 and catalysed with 1 part by weight of dimethyl benzylamine to 100 parts by weight of solution. Casting and hardening were carried out as described in Example 8. The hardened, yellow homogeneous resin castings were found to have the following properties:

| | |
|---|---|
| Tensile strength (DIN 53455): | 78.4 MPa |
| Elongation at break (DIN 53455): | 2.7 mm |
| E-modulus (DIN 53455): | 3730 MPa |
| Flexural strength (DIN 53452): | 143.0 MPa |
| Deflection (DIN 53452): | 3.2 mm |
| Impact strength (DIN 53453): | 18.3 kJ/m$^2$ |
| Ball indentation hardness $H_{30}$ (DIN 53456): | 156 MPa |
| Martens temperature (DIN 53462): | 151° C |

We claim:
1. A hardenable mixture comprising:

A. 40 to 90% by weight of at least one polyfunctional aromatic cyanic acid ester;

B. 10 to 60% by weight of at least one polymerisable olefinically unsaturated monomer selected from the group consisting of diisobutylene, styrene, styrene nuclearly substituted with alkyl having 1 to 4 carbon atoms in the alkyl group, α-methyl styrene, vinyl chloride, vinyl acetate, acrylic and methacrylic acid esters with 1 to 8 carbon atoms in the alcohol component, acrylonitrile and diallyl phthalate and, optionally C. 0.01 to 10% by weight, based on the sum of (A) and (B) of at least one hardening catalyst.

2. A hardenable mixture as claimed in claim 1, which comprises from 50 to 70% by weight of component (A), from 30 to 50% by weight of component (B) and from 0.01 to 5% of component C.

3. A hardenable mixture as claimed in claim 1 wherein the aromatic cyanic acid ester (B) corresponds to the general formula II:

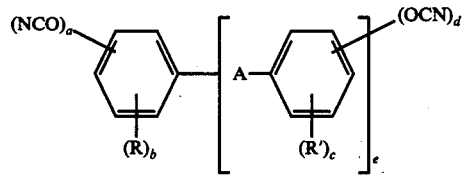

in which

R represents hydrogen, halogen (fluorine, chlorine, bromine, iodine), linear or branched $C_1$-$C_9$-alkyl or phenyl, two adjacent radicals R on the same nucleus together forming a carbocyclic 5-membered or 6-membered ring or together and in conjunction with a hetero atom (O, S, N) forming a 5-membered or 6-membered heterocyclic ring, alkoxy radicals with 1 to 4 carbon atoms, alkoxy carbonyl radicals with 1 to 4 carbon atoms in the alkyl group;

R' has the same meaning as R or represents the group

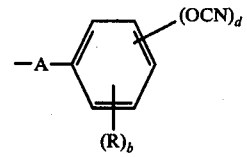

where

A is direct bond, a $C_1$-$C_9$-alkylene group optionally substituted by $C_1$-$C_4$-alkyl or phenyl, a cycloaliphatic or aromatic 5-membered or 6-membered ring, a cycloaliphatic or aromatic 5-membered or 6-membered ring, interrupted by an oxygen atom, oxygen, the sulphonyl group (—SO$_2$—), the carbonyl dioxy group

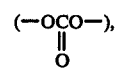

the carbonyl group;

$a$ is a number from 0 to 5 where $e = 1$ and a number from 2 to 5 where $e = 0$;

$b = 5 - a$ where $e = 1$ and $6 - (a + d)$ where $e = 0$;

$c = 5 - d$;

$d$ is a number from 0 to 5;

$e$ is the number 0, 1, 2 or 3;

with the proviso that the sum of $a$ and $d$ ($a + d$) always gives a number from 2 to 5.

4. A hardenable mixture as claimed in claim 1, wherein the olefinically unsaturated monomer (A) comprises styrene or an acrylic or methacrylic acid ester with 1 to 4 carbon atoms in the alcohol component or a mixture thereof.

5. A process for the production of a hardened plastics moulding, covering, coating or bond, wherein a mixture comprising A. 40 to 90% by weight of at least one aromatic polyfunctional cyanic acid ester, B. 10 to 60% by weight of at least one polymerisable olefinically unsaturated monomer, is heated to a temperature of from 20° to 250° C., optionally in the presence of C. 0.01 to 10% by weight, based on the sum of (A) and (B), of at least one hardening catalyst.

6. A process as claimed in claim 5, wherein heating is interrupted prior to hardening and continued at a subsequent stage.

7. A process as claimed in claim 5, wherein the mixture is heated in the presence of one or more of reinforcing agents, pigments, fillers, flameproof additives, dyes, extenders and plasticisers.

8. A process as claimed in claim 5, wherein the mixture is heated in the presence of 0.01 to 5% based on the weight of the mixture of a hardening catalyst.

* * * * *